United States Patent [19]

Gavin

[11] Patent Number: 5,601,291
[45] Date of Patent: Feb. 11, 1997

[54] EMBEDDED IN CONCRETE, ELASTOMERIC SEAL FOR PIPES

[76] Inventor: Norman W. Gavin, 2545 Ridge Rd., North Haven, Conn. 06473

[21] Appl. No.: 412,673

[22] Filed: Mar. 29, 1995

[51] Int. Cl.⁶ .................................................. F16J 15/10
[52] U.S. Cl. ............... 277/9.5; 277/207 A; 277/DIG. 10
[58] Field of Search .......................... 277/9, 9.5, 186, 277/207 A, 212 FB, DIG. 10

[56] References Cited

U.S. PATENT DOCUMENTS

| | | | |
|---|---|---|---|
| 2,635,907 | 4/1953 | Heimbuch | 277/227 |
| 3,363,912 | 1/1968 | Holloway | 277/207 A |
| 3,493,237 | 2/1970 | Kleindienst | 277/207 A |
| 3,787,061 | 1/1974 | Yoakum | 277/164 |
| 3,813,107 | 5/1974 | Ditcher | 277/189 |
| 3,870,186 | 3/1975 | Reinhard | 277/207 A |
| 4,103,901 | 8/1978 | Ditcher | 277/9.5 |
| 4,227,700 | 10/1980 | Merry | 277/186 |
| 4,333,662 | 6/1982 | Jones | 277/207 A |
| 4,342,462 | 8/1982 | Carlesimo | 277/101 |
| 4,350,351 | 9/1982 | Martin | 277/207 A |
| 4,805,920 | 2/1989 | Gavin | 277/207 A |
| 4,809,994 | 3/1989 | Skinner et al. | 277/207 A |
| 4,951,914 | 8/1990 | Meyers et al. | 249/11 |
| 4,991,858 | 2/1991 | Abila et al. | 277/207 A |
| 5,048,648 | 9/1991 | Le Deit | 277/212 FB |
| 5,286,040 | 2/1994 | Gavin | 277/207 A |
| 5,288,087 | 2/1994 | Bertoldo | 277/207 A |

FOREIGN PATENT DOCUMENTS

402783  8/1967  Australia  ............................ 277/207 R

Primary Examiner—William A. Cuchlinski, Jr.
Assistant Examiner—John L. Beres
Attorney, Agent, or Firm—Robert A. Seemann

[57] ABSTRACT

A cylindrical housing anchored in the opening of a concrete wall has a first cylindrical wall of generally uniform diameter attached to the inner side of the cylindrical housing and extending axially into the housing, a second generally radial annular wall has a radially outward side attached to the first wall and seals against a pipe through the cylindrical housing.

6 Claims, 6 Drawing Sheets

EMBEDDED IN CONCRETE, ELASTOMERIC SEAL FOR PIPES

BACKGROUND OF THE INVENTION

1. Field of the Invention

This invention relates to water tight sealing between the concrete walls of septic tanks and like subterranean concrete vessels, and pipes which pass through the walls for carrying effluent therethrough. More specifically it relates to the design of a seal which is embedded in the concrete wall during casting of the concrete wall, that seals against any one of a variety of septic pipes that are used in the trade, including straight walled, corrugated, and schedule 40 pipe.

2. Description of the Prior Art

It is difficult to obtain a thorough, and long lasting seal between the concrete wall of a septic tank and a pipe that is inserted through the wall by way of the seal.

This is especially so when the pipe is of the heavy duty corrugated variety. The seal must permit a series of major and minor diameter ridges of the pipe pass through the seal without damage to the seal wiper when the pipe is installed in the septic tank, and seal thoroughly against the pipe at any place along the length of the pipe that the installer desires. The seal should not apply significant axial bias on the pipe which may cause it to shift after installation, because the person installing the system moves out of reach of the pipe after it is passed through the seal, and the seal should remain water tight even though the pipe may shift during refill of the septic system trench in which the septic pipe runs.

Many designs of cast in concrete seals for septic pipes have been developed in an attempt to solve the above problems.

U.S. Pat. No. 3,787,061 patented Jan. 22, 1974 by R. E. Yoakum describes a hollow walled ring of flexible elastomeric material, the hollow wall being trapezoidal in cross section. The radially outward facing wall of the ring has a pair of circumferential radially outward facing tangs. The ring is cast into the concrete wall peripheral to the opening through the wall to a depth in the wall to which the concrete encloses the tangs, the radially outward facing wall, and the front and back side walls of the ring.

The inner facing wall of the ring has a pair of extending, tapering, annular ribs which straddle the center of the inner facing wall and project obliquely from the inner facing wall, inwardly and toward the front and back opening of the seal.

The outer facing wall of the ring has a hole for inserting a one-coil spring from one end of the spring, into the hollow ring in order to snake it around within the hollow ring. After installation of the spring, the two ends of the spring extend from the hole and are accessible by the user by way of an axial passageway in the concrete adjacent to the outer facing wall.

The spring constricts upon the inner wall of the hollow ring, from within the hollow ring, biasing the inner wall toward a pipe that is inserted through the seal. This presses the oblique tapered annular ribs against the pipe.

As the oblique ribs diverge, it could be difficult to insert the pipe from either end of the seal. In order to ease entry of the pipe into the seal, the operator accesses the ends of the spring via the axial passageway in the concrete, and squeezes the ends of the spring to release the constricting force of the spring on the inner wall.

U.S. Pat. No. 3,813,107, patented May 28, 1974, by J. Ditcher, describes a hollow walled ring of flexible elastomeric material, the ring having the general configuration of a capital A in cross section, but with slightly splayed legs.

The ring is cast into the concrete wall peripheral to the opening through the wall to a depth in which the wall encloses the legs and is level with the top of the cross bar of the A shape. The apex of the A that remains above the concrete yields to the pipe, forming a hollow, slightly splayed over, oval seal against the pipe as the pipe is pushed through the seal.

U.S. Pat. No. 4,103,901, patented Aug. 1, 1978, by J. Ditcher, describes an assembly which is described here as seen in cross section, in order, from the periphery toward the center of an annulus of flexible elastomeric material. It is a radially oriented T with a bulbous bottom end, followed by a first oblique leg extending beyond one side of center line, followed by a reverse angled second oblique leg which crosses back to the other side of center line, ending in a bulbous termination. The bulbous termination is an O-ring which grips the pipe that is inserted through the seal. The T with bulbous bottom end is fully embedded in the concrete. Because the O-ring has little latitude for expansion and may resist insertion of the pipe, a temporary lubricated nose cone of frustoconical shape is sometimes placed on the pipe before it is inserted through the O-ring. If the pipe is smaller than the O-ring, a stainless steel tension band may be placed over the second oblique leg to clamp it around the pipe.

U.S. Pat. No. 4,350,351, patented Sep. 21, 1982, by A. E. Martin, describes an assembly which is described here in cross section, taken in order, from the periphery toward the center of an annulus of flexible elastomeric material. It is a first bead, a second bead of the same diameter as the first bead, a short radial leg about the same length as the bead diameter. The first and second beads, and about one half of the short leg are embedded in the concrete. An oblique leg about three and one half times the length of the short radial leg is attached to the short leg. The oblique leg is directed about 60 degrees from the radial away from the pipe receiving opening of the seal. The end of the oblique leg has an integral bead with a reverse curl toward the back of the leg. The reverse curl holds a hollow core ring that is preferably glued to the reverse curl.

When the pipe is pushed into the seal it contacts the front of the oblique leg, the oblique leg is forced outward whereby the leg becomes parallel to and in intimate contact over its full length with the outer wall of the pipe, and the hollow core ring becomes sandwiched between the reverse curl and the inner wall of the opening through the concrete. The sandwiched ring increases pressure of the leg against the pipe to make a firmer seal on the pipe.

U.S. Pat. No. 4,333,662, patented Jun. 8, 1982 by W. D. Jones, describes an annulus of flexible elastomeric material which is described here as seen in cross section, taken in the direction from a hollow ring in sealing contact with the pipe, toward the outer radial periphery of the seal assembly. It is the hollow ring a short radial connector leg attached to a pyramidal base with surfaces that diverge at a dihedral angle of about 140 degrees relative to one another. The diverging elastomeric surfaces protect the pipe from being damaged by the concrete surface of the opening. The lower portion of the base is cast into the concrete which forms the opening through the wall. Additional legs extend, one from each side of the base, and cover the remaining concrete on the inward facing surface of the opening through the wall. Each leg then folds back inward in a V, where the outer leg of the V is also cast in the concrete.

U.S. Pat. No. 4,342,462, patented Aug. 3, 1982 by J. Carlesimo, describes an annulus of flexible elastomeric material which is an outer cylindrical housing that fits within the opening of the concrete housing and has a radially outward extending element embedded in the concrete. A first cylindrical wall having a diameter that is smaller than the diameter of the cylindrical housing and having a first end and a second end is attached by the first end to one end of the housing and extends axially beyond the housing. A second cylindrical wall having a diameter that is smaller than the diameter of the first cylindrical wall is attached to the second end and extends axially away from the cylindrical housing. A strap around the second wall clamps the second wall around pipe that extends through the housing.

U.S. Pat. No. 5,286,040, patented Feb. 15, 1994 by N. W. Gavin, describes an annulus of flexible elastomeric material comprising an outer cylindrical wall that fits within the opening in the concrete housing and has a radially outward extending element embedded in the concrete during the casting of the concrete housing. The outer tubular wall further has an inward depending, frustoconical wall. The smaller diameter end of the frustoconical wall seals against the pipe. A diaphragm attached to the annular edge of the smaller diameter end and sealing over the smaller diameter end has different diameter tear out rings so that various size openings can be made at the smaller diameter end to seal around various diameter pipes. In casting the seal in the concrete wall of the housing, the seal is mounted by the frustoconical wall of the seal, on a frustoconical plug which is mounted on a movable portion of the wall of the mold. Axially extending pins on the diaphragm engage the smaller diameter face of the frustoconical plug and align the seal about the axis of the cylindrical wall in a preferred rotational position. U.S. Pat. No. 4,951,914, patented Aug. 28, 1990 by Meyers et al., describes an annulus of flexible elastomeric material comprising an outer cylindrical wall that fits within an opening in a wall of a concrete housing and has a radially outward extending element embedded in the concrete during the casting of the concrete wall of the housing. The outer cylindrical wall has an inward depending, frustoconical wiper attached by the larger diameter end to one end of the cylindrical wall. The smaller diameter end of the frustoconical wiper extends into the cylinder and seals against the pipe.

In casting the seal in the wall, a frustoconical plastic mandrel bolted on a swing out portion of the mold wall seats in the frustoconical wiper of the seal. The mandrel has, at the radially outward edge of the smaller diameter end, a gripper portion which releasably frictionally retains the free end of the frustoconical wiper wall from one side during casting of the seal assembly in the concrete wall of the housing. An annular knock out plug or plate, rests against the smaller diameter end of the mandrel within the confines of the outer cylindrical wall ill order to prevent entry of liquid concrete into the space between the outer cylindrical wall and the frustoconical wiper.

Although prior art inventions may serve the purposes for which they were intended, there are still problems which must be solved if a full feature embedded in concrete septic tank seal for pipes is desired.

For example, an oblique sealing element may not line up with the ribs on some pipes. Space between a pair of oblique ribs varies with constrictive pressure on the pipe because of the oblique angles. Ribbed pipe may interfere with the full seating of each rib of a plurality of sealing ribs against the pipe. A seal element that splays over to one side or the other as the pipe is pushed through the seal may not follow into the minor diameter of the ribs of a ribbed pipe. A closely supported O-ring seal may not follow completely, or yield sufficiently, to the contour of a corrugated pipe as it is thrust through the seal. An auxiliary clamp or spring which must be adjusted may add unacceptable inconvenience or cost to installation of the pipe in the subterranean concrete vessel on the job site.

SUMMARY OF THE INVENTION

It is one object of the invention to provide an embedded in concrete pipe seal for septic systems that provides a watertight seal against the outer surface of a pipe of uniform diameter.

It is another object of the invention that the embedded in concrete pipe seal provides a watertight seal against the outer surface of a corrugated pipe.

It is another object that the seal prevents leakage of water from within the subterranean concrete vessel to the surrounding earth.

It is another object that the seal prevents leakage of water water from surrounding earth into the subterranean concrete vessel.

It is another object that the seal protects the pipe against damage from the concrete of the opening through which the pipe passes.

It is another object that the seal can support the weight of the buried pipe without damage to the seal body or leakage.

It is yet another object of the invention that sealing between the vessel and the pipe remains effective if the angle between the pipe and vessel changes after installation due to characteristic settling of the septic system concrete vessel and piping.

It is still another object that sealing assembly of the pipe in the concrete vessel wall opening can be done easily, without special tools, aids or need for special skill or dexterity.

Other objects and advantages will become apparent to one reading the ensuing description of the invention.

An elastomeric seal for Sealing a pipe through a concrete wall includes a cylindrical housing having a central axis and anchor means adapted for being east in the concrete wall so that there is a water tight seal between the concrete wall and the cylindrical housing.

A first cylindrical wall being of generally uniform diameter, and concentric with the central axis, is attached at one end to the inner side of the cylindrical housing, and has the other end extending axially into the cylindrical housing.

A second generally radial annular wall has a radially outward side attached to the first end of the first wall, is generally normal to the first wall, and comprises means for sealing against a pipe inserted through the cylindrical housing.

The housing and the first cylindrical wall comprise a cylindrical slot between them generally concentric with the first wall.

The second wall comprises, radially inward of the first wall, reversible fastening means for reversibly fastening the elastomeric seal to a mold of a concrete wall for a vessel, the reversible fastening means comprising an axial pin having a snap protrusion adapted for engaging an opening on the mold.

BRIEF DESCRIPTION OF THE DRAWINGS

In order that the invention be more fully comprehended, it will now be described, by way of example, with reference to the accompanying drawings, in which.

DESCRIPTION OF THE PREFERRED EMBODIMENTS

Before explaining the invention in detail, it is to be understood that the invention is not limited in its application to the detail of construction and arrangement of parts illustrated in the drawings since the invention is capable of other embodiments and of being practiced or carried out in various ways. It is also to be understood that the phraseology or terminology employed is for the purpose of description only and not of limitation.

Figure 1:
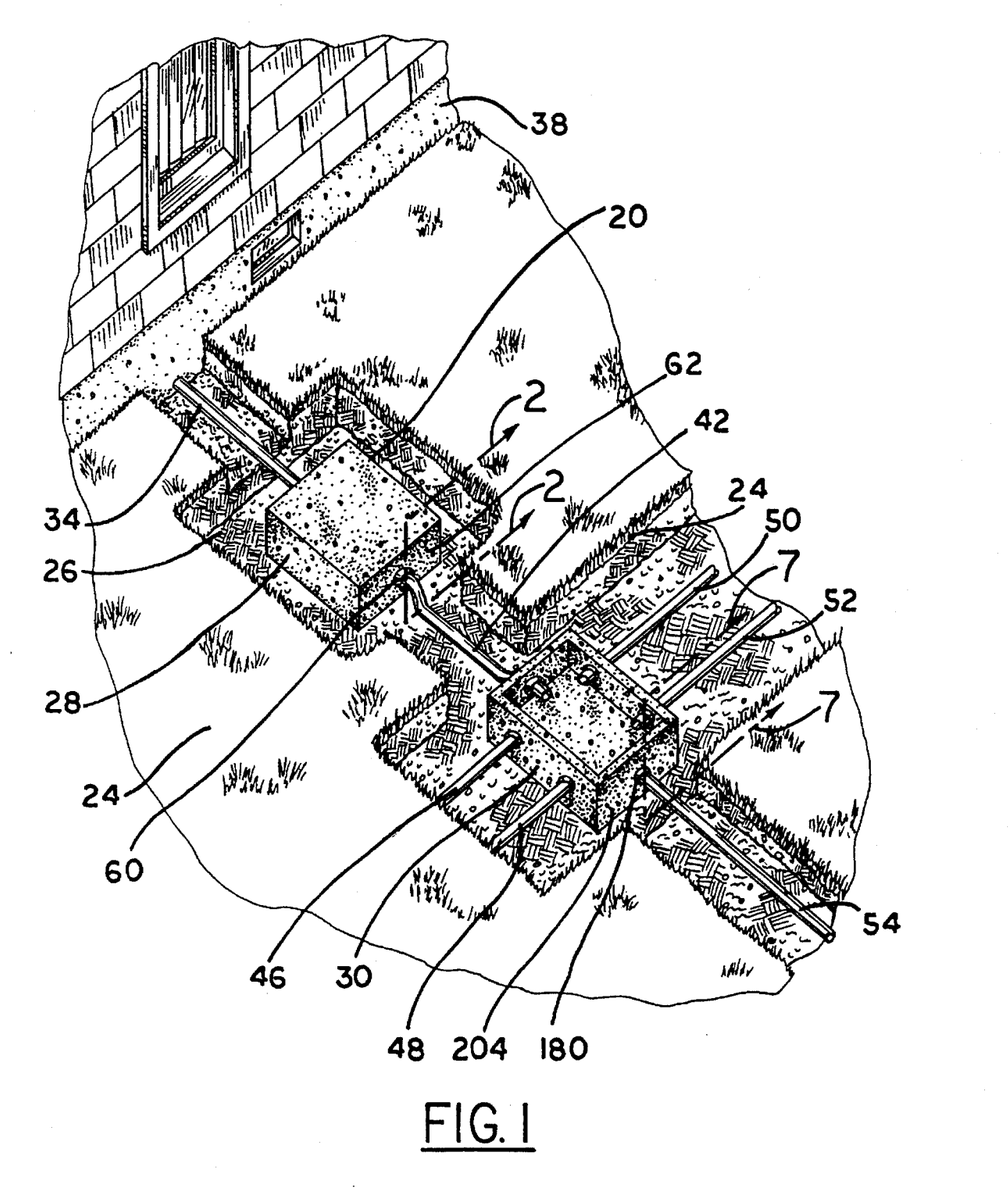
FIG. 1 is a fragmentary perspective view of an underground septic tank system having the present invention.

In FIG. 1, septic tank system 20 is installed and buried below ground 24 in installation pit 26. The system includes two concrete vessels, septic tank 28, and distribution box 30.

Plastic pipe 34 carries waste from house 38 to vessel 28 where it is digested. Liquid for distribution to the septic fields (not shown) by the distribution box rises to the top of vessel 28, and is delivered to vessel 30 by way of pipe 42. The liquid is then distributed to the septic fields by vessel 30 by way of pipes 46, 48, 50, 52, and 54. Pipe 42 is connected to vessel 28 by way of cast in concrete seal 60 in concrete wall 62 of vessel 28.

Pipe 42 is supported by the earth upon which it rests at the bottom of installation pit 26, and by seal 60. Seal 60 is subjected to great stress from misalignment of the pipe, settling of the earth which also supports the vessels, and backfill, the dumping of earth back into the pit in order to bury the septic tank system.

Figure 2:
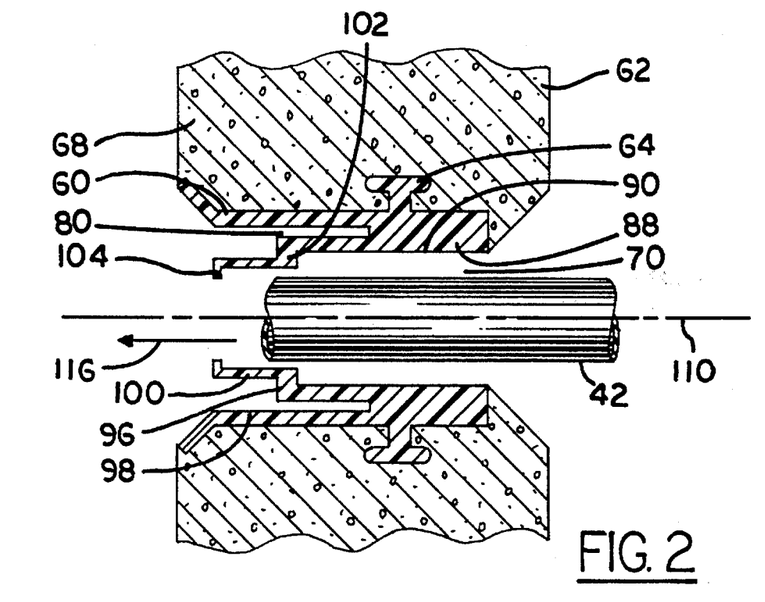
FIG. 2 is a cross section view taken at 2—2 of FIG. 1, of a portion of the concrete septic tank of the septic tank system, incorporating the present invention cast in concrete pipe seal.

Referring now to FIG. 2 and a preferred construction of a cast in concrete seal according to the invention, molded flexible elastomeric seal 60 is and bored by annular flange 64 into the concrete 68 surrounding opening 70 through wall 62. Seal 60 is cast into the wall, and is part of the mold which defines opening 70, as will be explained later.

A water tight seal between seal 60 and concrete 68 is established by intimate contact of the concrete with wall 88 and with annular flange 64.

Cylindrical slot 80 is located preferably within cylindrical wall 88 so that inward facing side 90 of wall 88 is straight and of uniform diameter. Cylindrical walls 96, 98, and 100 are concentric with each other and axis 110 of wall 88.

Radial walls 102 and 104 each are generally normal (90 degrees) to axis 110.

Seal 60 receives pipe 42 from outside the vessel by insertion in direction 116.

Figure 3:
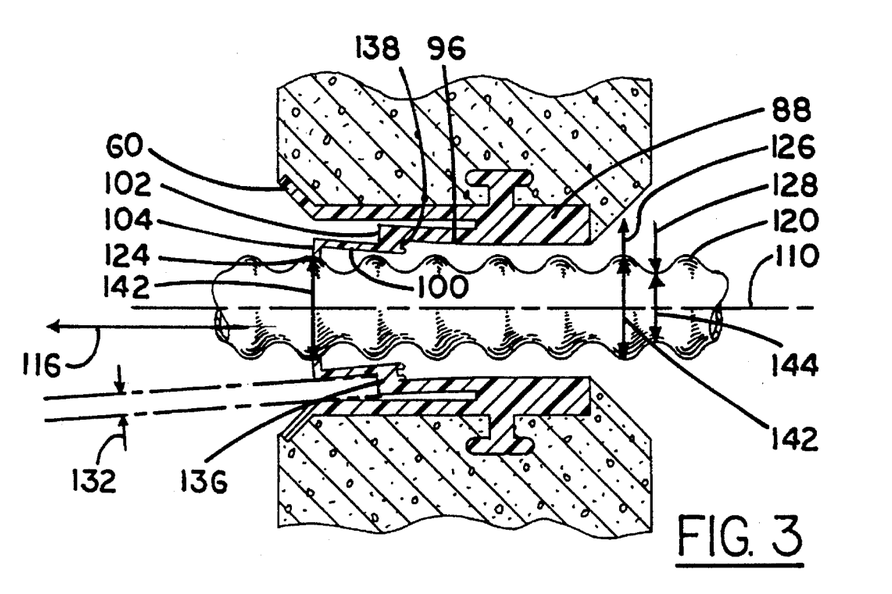
FIG. 3 is a cross section view of the seal of FIG. 2 receiving corrugated septic system pipe.
Figure 4:
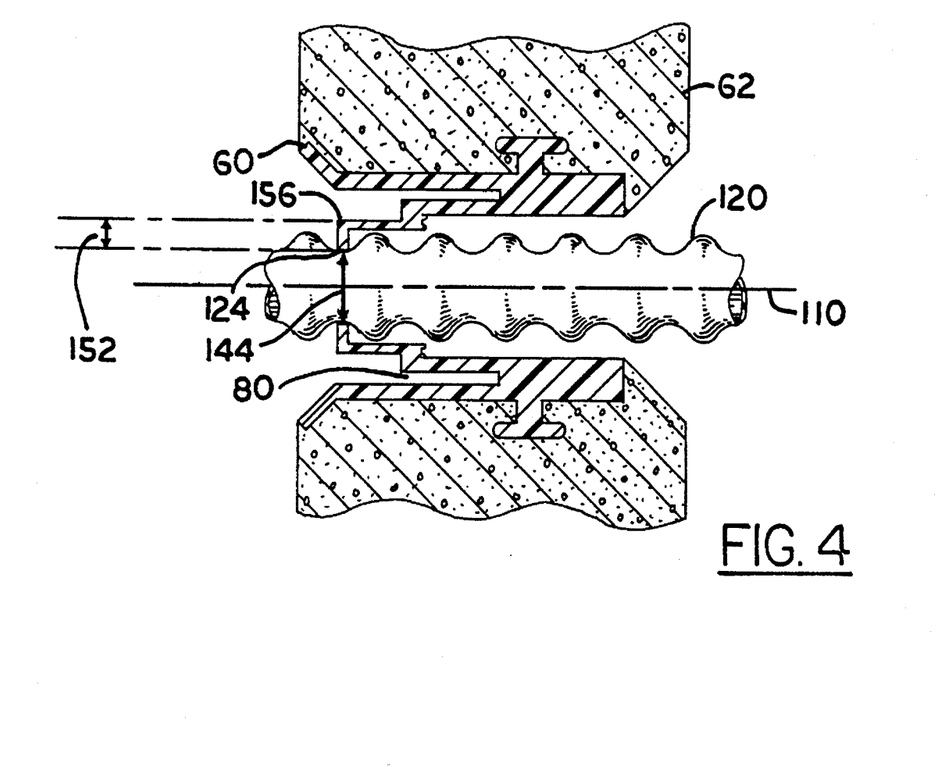
FIG. 4 is a cross section view of the seal of FIG. 2 holding corrugated septic system pipe.

Referring to FIGS. 3 and 4, corrugated pipe 120 is inserted in seal 60 in direction 116. An inserted pipe applies radially outward biasing force 126 via annular interface 124 between the seal and the pipe, to the seal walls which cooperate to resist the outward biasing force and provide radially inward sealing force 128 via interface 124 against the pipe. Walls 96, 102, 100, and 104 respond in different, interrelated ways.

Wall 96 having a long fulcrum arm and a relatively small radial thickness, contributes a moderate sealing pressure. Having a relatively long length compared to the radial thickness of cylindrical slot 80, wall 96 arcs outward readily, yet remains generally parallel to cylindrical wall 88. The ratio of length to thickness of slot 80 is greater than unity, preferably greater than 5 to 1.

Wall 102, having a radial thickness equal to radial height 132, has high resistance to diametric expansion. It expands normal to axis 110, contributing a first level of high sealing force, until slot 80 is closed, whereupon wall 102 provides a higher level of sealing force. Wall 102 can also crush, and rotate slightly about annular connecting joint 136.

Figure 6:
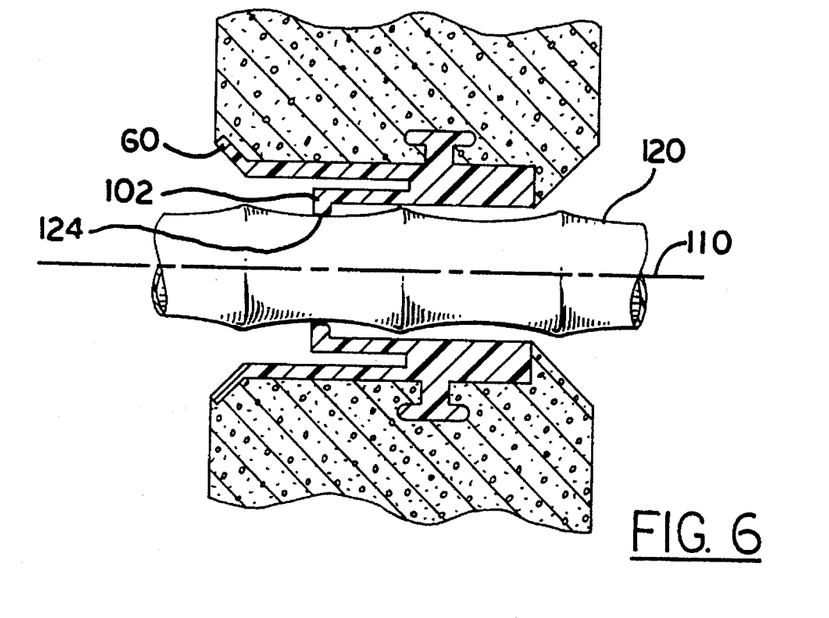
FIG. 6 is a cross section view of another cast in concrete seal of the present invention, holding schedule 40 pipe.

Wall 102 can operate as an annular interface 124, as shown in FIG. 6. This is done by inserting a screw driver in weakened annular separation ring 138 and prying away elements of the seal radially inward of ring 138. The seal may include concentric or asymmetrical annular separation rings. Details of the rings and how they work are described in U.S. Pat. No. 5,286,040 by Gavin. U.S. Pat. No. 5,286,040 is hereby incorporated by reference.

Wall 100 arcs outward, having a lower radial thickness than wall 102 or 104, provides a moderate sealing force, and provides room for diametric expansion of wall 104.

Wall 104 is shown in FIGS. 3 and 4, operating as an annular interface 124. It is shown operating as an annular interface 124 on a major diameter 142, and on a minor diameter 144.

Having a radial thickness equal to radial height 152, wall 104 has high resistance to diametric expansion. It expands normal to axis 110, contributing a high sealing force. Wall 104 can also crush, and rotate slightly about annular connecting joint 156.

Figure 5:
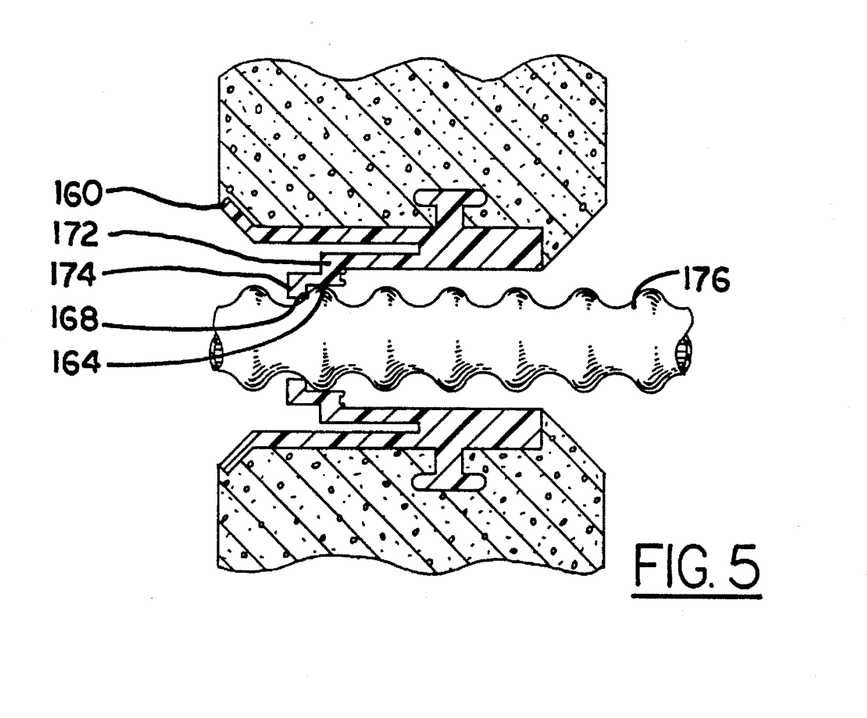
FIG. 5 is a cross section view of another cast in concrete seal of the present invention.

Cast in concrete seal 160 in FIG. 5 has annular interfaces 164 and 168 provided by radial walls 172 and 174 respectively, which apply a higher total sealing force on pipe 176.

Figure 7:
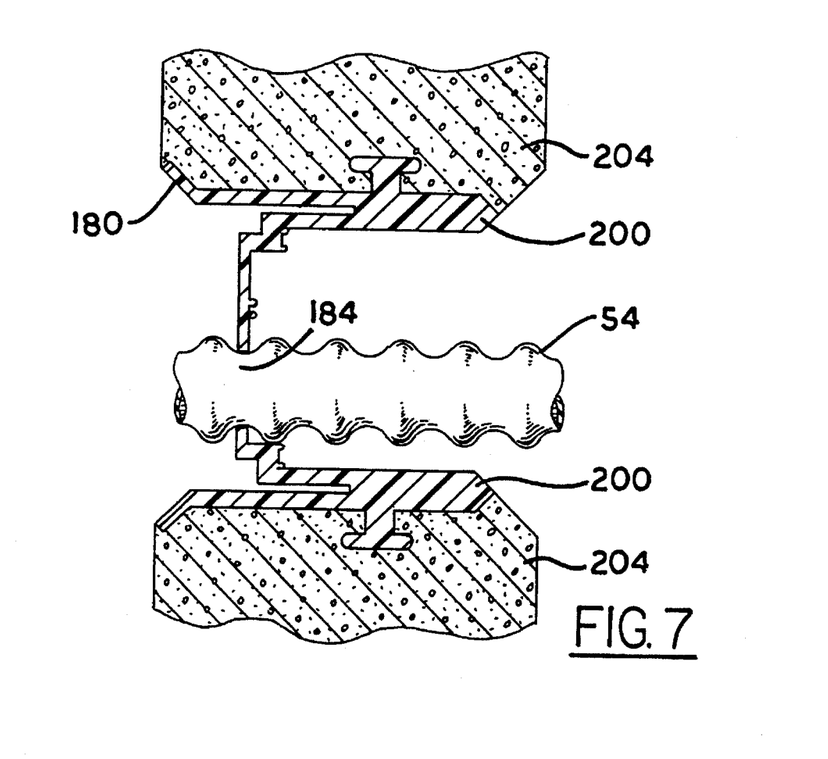
FIG. 7 is a cross section view taken at 7—7 of FIG. 1, of a portion of the concrete distribution box of the septic tank system, incorporating the present invention cast in concrete pipe seal.
Figure 9:
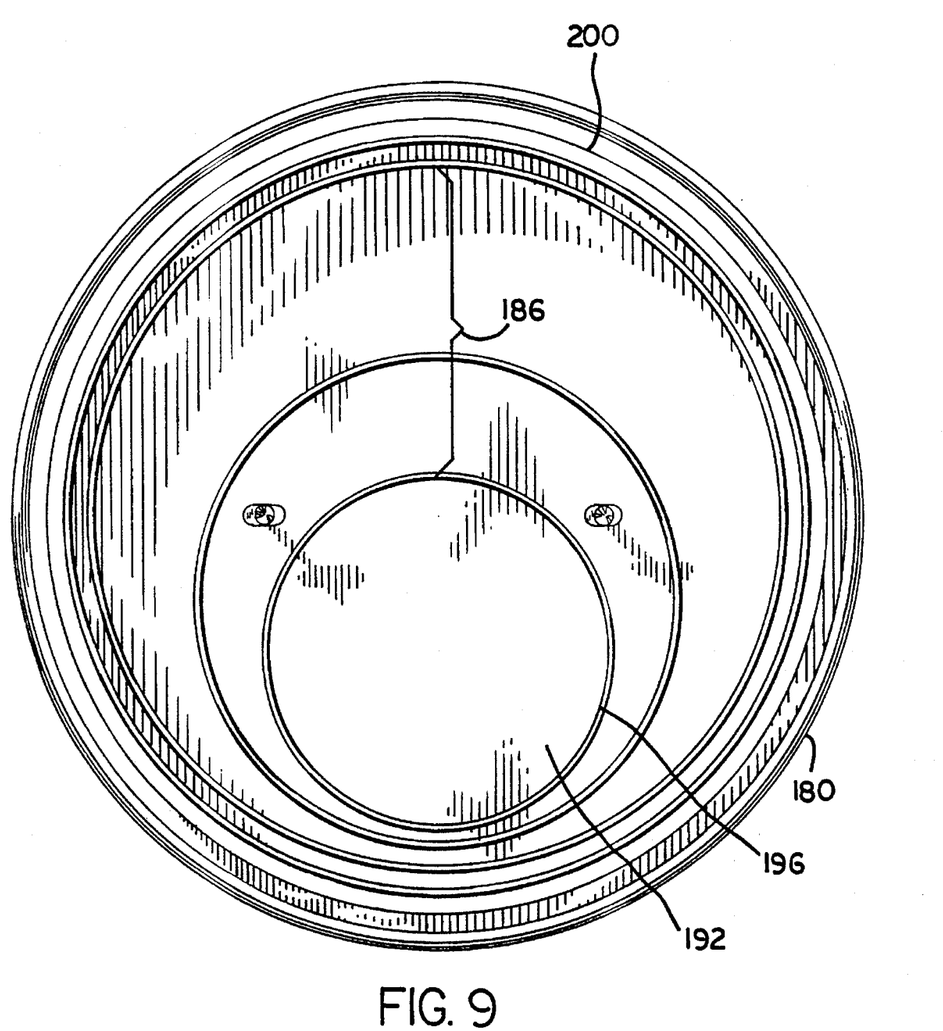
FIG. 9 is a front view of the seal of FIG. 8.

Referring to FIGS. 1, 7, and 9, cast in concrete seal 180 holds pipe 54 in asymmetrical opening 184 through the seal, of radial wall 186. The asymmetrical opening was provided by removing section 192 of the seal within weakened annular separation ring 196. Locating the pipe closer to cylindrical wall 200 which is directly supported by the concrete wall 204 provides better support for the pipe and better drainage from the distribution box.

Figure 8:
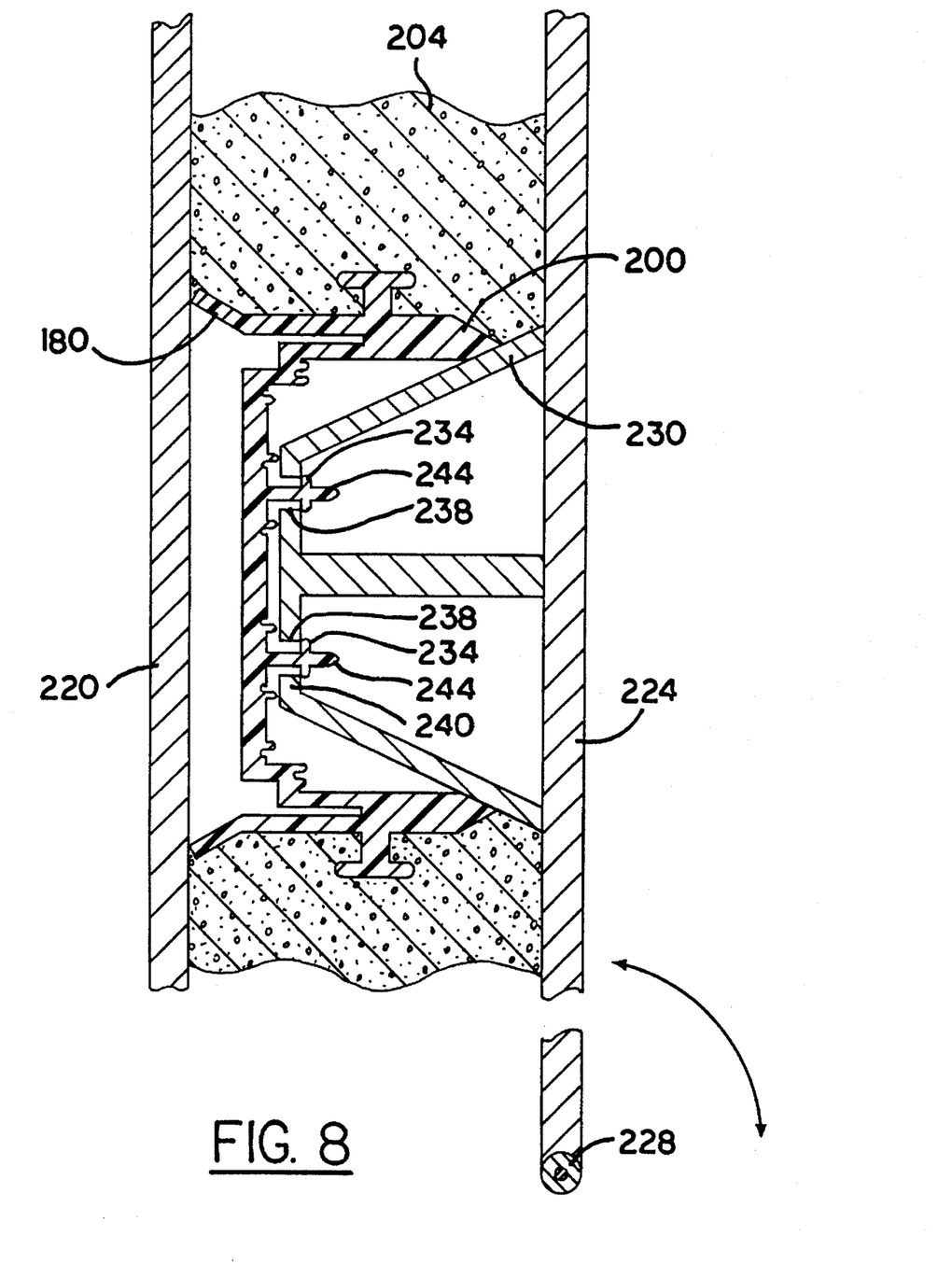
FIG. 8 is a cross section view of a seal of the present invention, held in the mold for casting the vessel wall with the opening through the wall and the seal in the opening, integral with the wall.

In FIG. 8, seal 180 is in a mold for casting the seal with the wall. Steel plate 220 defines the inner facing side of wall 204. Steel plate 224 defines the outward facing side of wall 204, and pivots outward on bearing 228. A similar arrangement for the plates is seen in U.S. Pat. No. 5,286,040.

Support core 230 is designed to hold the present invention seal for positioning it between the steel plates. As axial lengths of the cylindrical walls and radial heights of the radial walls may vary between various models of the seal of the present invention, support core 230 must be able to hold the seal in a consistent manner from seal to seal. For this purpose, a reversible fastening means is provided on an radial wall that is normal to the axis of the seal, spaced inward from the axial walls of the seal.

Reversible fastener snap protrusion 234 holds the seal on core 230 by engaging holes 238 on radial wall 240 of the core. Preferably the reversible fastening means is combined with an orienting means such as pin 244 to position asymmetrical sections of the seal as desired with respect to the bottom of the concrete wall.

Although the present invention has been described with respect to details of certain embodiments thereof, it is not intended that such details be limitations upon the scope of the invention. It will be obvious to those skilled in the art that various modifications and substitutions may be made without departing from the spirit and scope of the invention as set forth in the following claims.

What is claimed is:

1. An elastomeric seal for sealingly receiving a pipe through a concrete wall of a subterranean vessel, said seal comprising:

a cylindrical housing having a central axis, a first end, a second end, an inner side and an outer side, anchor means comprising said outer side of said cylindrical housing, adapted for being cast in said concrete wall so there is a watertight seal between said concrete wall and said cylindrical housing, a first, cylindrical wall of generally uniform diameter, having a first end and having a second end attached to said inner side of said cylindrical housing, said first end extending axially into said cylindrical housing, a second, generally radial, annular wall having a radially outward side attached to the first end of said first wall, and said second wall comprising means for sealing against a pipe inserted through said cylindrical housing, said first cylindrical wall being concentric with said central axis, said second wall being generally normal to said first wall, said housing and said first cylindrical wall comprising a cylindrical slot between them generally concentric with said first wall, said second, generally radial, annular wall having a radially inward side, a third, cylindrical wall of generally uniform diameter having a first end and having a second end attached to said radially inward side of said second wall, and comprising said means for sealing against a pipe inserted through said cylindrical housing, a fourth, generally radial, annular wall having a radially outward side attached to the first end of said third, cylindrical wall, and comprising said means for sealing against a pipe inserted through said cylindrical housing.

2. The seal of claim 1, further comprising:

said means for sealing comprising, radially inward of said first wall, reversible fastening means for reversibly fastening said elastomeric seal to a mold of a concrete wall for a vessel.

3. The seal of claim 2, further comprising:

said reversible fastening means comprising an axial pin having a snap protrusion adapted for engaging an opening on said mold.

4. An elastomeric seal for sealingly receiving a pipe through a concrete wall of a subterranean vessel, said seal comprising:

a cylindrical housing having a central axis, a first end, a second end, an inner side and an outer side, anchor means comprising said outer side of said cylindrical housing, adapted for being cast in said concrete wall so there is a watertight seal between said concrete wall and said cylindrical housing, a first, cylindrical wall of generally uniform diameter, having a first end and being attached to said inner side of said cylindrical housing, said first end extending axially within said cylindrical housing, a second, generally radial, annular wall having a radially outward side attached to said first wall, and said second wall comprising means for sealing against a pipe inserted through said cylindrical housing, said first cylindrical wall being concentric with said central axis, said second wall being generally normal to said first wall, said housing and said first cylindrical wall comprising a cylindrical slot between them generally concentric with said first wall, said second, generally radial, annular wall having a radially inward side, a third, cylindrical wall of generally uniform diameter having a first end and having a second end attached to said radially inward side of said second wall, and comprising said means for sealing against a pipe inserted through said cylindrical housing, a fourth, generally radial, annular wall having a radially outward side attached to the first end of said third, cylindrical wall, and comprising said means for sealing against a pipe inserted through said cylindrical housing.

5. The seal of claim 4, further comprising:

said means for sealing comprising, radially inward of said first wall, reversible fastening means for reversibly fastening said elastomeric seal to a mold of a concrete wall for a vessel.

6. The seal of claim 5, further comprising:

said reversible fastening means comprising an axial pin having a snap protrusion adapted for engaging an opening on said mold so that the fastening means prevents axial withdrawal of the seal from the mold for casting of the molded elastomeric seal in the concrete wall and permits withdrawal of the seal from the core for mounting of another seal on the mold for casting.

* * * * *